United States Patent
Kwon et al.

(10) Patent No.: US 9,903,445 B2
(45) Date of Patent: Feb. 27, 2018

(54) PLANETARY GEAR TRAIN OF AUTOMATIC TRANSMISSION FOR VEHICLE

(71) Applicant: Hyundai Motor Company, Seoul (KR)

(72) Inventors: Hyun Sik Kwon, Seoul (KR); Seong Wook Hwang, Gunpo-si (KR); Wonmin Cho, Hwaseong-si (KR); Jae Chang Kook, Hwaseong-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/266,793

(22) Filed: Sep. 15, 2016

(65) Prior Publication Data
US 2017/0159770 A1 Jun. 8, 2017

(30) Foreign Application Priority Data
Dec. 2, 2015 (KR) .......................... 10-2015-0171004

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/006* (2013.01); *F16H 2200/201* (2013.01); *F16H 2200/2046* (2013.01); *F16H 2200/2097* (2013.01)

(58) Field of Classification Search
CPC ................ F16H 3/66; F16H 2003/445; F16H 2200/006; F16H 2200/201; F16H 2200/2046; F16H 2200/2097

USPC .................................................. 475/275–291
See application file for complete search history.

(56) References Cited

U.S. PATENT DOCUMENTS

| | | | | |
|---|---|---|---|---|
| 2004/0121875 A1* | 6/2004 | Usoro | ..................... | F16H 3/666 475/269 |
| 2005/0176550 A1* | 8/2005 | Bucknor | ................... | F16H 3/66 475/275 |
| 2005/0215384 A1* | 9/2005 | Bucknor | ................... | F16H 3/66 475/290 |
| 2005/0215388 A1* | 9/2005 | Raghavan | ............... | F16H 3/666 475/311 |

(Continued)

FOREIGN PATENT DOCUMENTS

| | | |
|---|---|---|
| JP | 2012-13209 A | 1/2012 |
| KR | 10-2012-0121158 A | 11/2012 |
| WO | WO 2013/088568 A1 | 6/2013 |

*Primary Examiner* — Roger L Pang
(74) *Attorney, Agent, or Firm* — Morgan, Lewis & Bockius LLP

(57) ABSTRACT

A planetary gear train of an automatic transmission for a vehicle may include an input shaft for receiving an engine torque, an output shaft for outputting a shifted engine torque, a first planetary gear set, a second planetary gear set, a third planetary gear set, and six control elements for selectively interconnecting the rotation elements, a first shaft connected with the first rotation element, and selectively connectable with the input shaft, a second shaft selectively connectable with the first shaft, a third shaft, a fourth shaft selectively connectable with the input shaft, a fifth shaft directly connected with the transmission housing, a sixth shaft selectively connectable with the first shaft, and a seventh shaft selectively connectable with the third shaft, and directly connected with the output shaft.

4 Claims, 2 Drawing Sheets

(56) References Cited

U.S. PATENT DOCUMENTS

| | | | |
|---|---|---|---|
| 2006/0063636 A1* | 3/2006 | Usoro | F16H 3/66 |
| | | | 475/296 |
| 2011/0028261 A1 | 2/2011 | Yamamoto et al. | |
| 2017/0074367 A1* | 3/2017 | Cho | F16H 3/66 |
| 2017/0152918 A1* | 6/2017 | Kwon | F16H 3/66 |

* cited by examiner

FIG. 2

| Shift-stage | C1 | C2 | C3 | C4 | C5 | C6 | Gear ratio |
|---|---|---|---|---|---|---|---|
| D1 | ● | | | ● | | ● | 4.300 |
| D2 | ● | | ● | | | ● | 2.515 |
| D3 | ● | | | | ● | ● | 1.853 |
| D4 | ● | ● | | | | ● | 1.000 |
| D5 | | ● | | | ● | ● | 0.741 |
| D6 | | ● | ● | | | ● | 0.541 |
| D7 | | ● | ● | | ● | | 0.400 |
| D8 | ● | ● | ● | | | | 0.338 |
| REV | ● | | ● | ● | | | -3.300 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0171004, filed Dec. 2, 2015, the entire contents of which is incorporated herein for all purposes by this reference.

BACKGROUND OF THE INVENTION

Field of the Invention

Various aspects of the present invention relate to an automatic transmission for a vehicle.

Description of Related Art

Recent increases in oil prices are triggering stiff competition in enhancing fuel consumption of a vehicle.

In this sense, research on an engine has been undertaken to achieve weight reduction and to enhance fuel consumption by so-called downsizing, and research on an automatic transmission has been performed to simultaneously provide better drivability and fuel consumption by achieving more shift stages.

However, in order to achieve more shift-stages for an automatic transmission, the number of internal components (particularly, planetary gear sets) increase, and as a result, a length of the transmission increases. This may deteriorate installability and/or power flow efficiency and may increase production cost, and weight.

Therefore, in order to maximally enhance fuel consumption of an automatic transmission having more shift stages, it is important for better efficiency to be derived by a smaller number of parts.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of, by minimal complexity, realizing at least forward eighth speeds and at least one reverse speed, thereby improving power delivery performance improve and fuel consumption due to multi-stages, and improving driving stability of a vehicle by utilizing low rotation speed of an engine.

According to various aspects of the present invention, a planetary gear train of an automatic transmission for a vehicle may include an input shaft for receiving an engine torque, an output shaft for outputting a shifted engine torque, a first planetary gear set including first, second, and third rotation elements, a second planetary gear set including fourth, fifth, and sixth rotation elements, a third planetary gear set including seventh, eighth, and ninth rotation elements, six control elements for selectively interconnecting the rotation elements, a first shaft connected with the first rotation element, and selectively connectable with the input shaft, a second shaft connected with the second rotation element and the fourth rotation element, and selectively connectable with the first shaft, a third shaft connected with the third rotation element, a fourth shaft connected with the fifth rotation element and the ninth rotation element, and selectively connectable with the input shaft, a fifth shaft connected with the sixth rotation element and directly connected with the transmission housing, a sixth shaft connected with the seventh rotation element and selectively connectable with the first shaft, and a seventh shaft connected with the eighth rotation element, selectively connectable with the third shaft, and directly connected with the output shaft.

The first planetary gear set may be a single pinion planetary gear set, where the first rotation element is a first sun gear, the second rotation element is a first planet carrier, and the third rotation element is a first ring gear, the second planetary gear set may be a single pinion planetary gear set, where the fourth rotation element is a second sun gear, the fifth rotation element is a second planet carrier, and the sixth rotation element is a second ring gear, and the third planetary gear set may be a single pinion planetary gear set, where the seventh rotation element is a third sun gear, the eighth rotation element is a third planet carrier, and the ninth rotation element is a third ring gear.

The six control elements may include a first clutch selectively connecting the input shaft and the first shaft, a second clutch selectively connecting the input shaft and the fourth shaft, a third clutch selectively connecting the third shaft and the seventh shaft, a fourth clutch selectively connecting the second shaft and the fourth shaft, a fifth clutch selectively connecting the first shaft and the second shaft, and a sixth clutch selectively connecting the second shaft and the sixth shaft.

Shift-stages realized by selective operation of three control elements among the six control elements may include a forward first speed shift-stage achieved by operation of the first, fourth, and sixth clutches, a forward second speed shift-stage achieved by operation of the first, third, and sixth clutches, a forward third speed shift-stage achieved by operation of the first, fifth, and sixth clutches, a forward fourth speed shift-stage achieved by operation of the first, second, and sixth clutches, a forward fifth speed shift-stage achieved by operation of the second, fifth, and sixth clutches, a forward sixth speed shift-stage achieved by operation of the second, third, and sixth clutches, a forward seventh speed shift-stage achieved by operation of the second, third, and fifth clutches, a forward eighth speed shift-stage achieved by operation of the first, second, and third clutches, and a reverse speed shift-stage achieved by operation of the first, third, and fourth clutches.

A planetary gear train according to various embodiments of the present invention may realize at least eight forward speeds and at least one reverse speed by operating the three planetary gear sets by controlling six control elements.

In addition, a planetary gear train according to various embodiments of the present invention may substantially improve driving stability by realizing shift-stages appropriate for rotation speed of an engine due to multiple speed-stages of an automatic transmission.

Furthermore, a planetary gear train according to various embodiments of the present invention maximize engine driving efficiency by multiple speed-stages of an automatic transmission, and may improve power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages in the planetary gear train according to various embodiments of the present invention.

Figure 1:
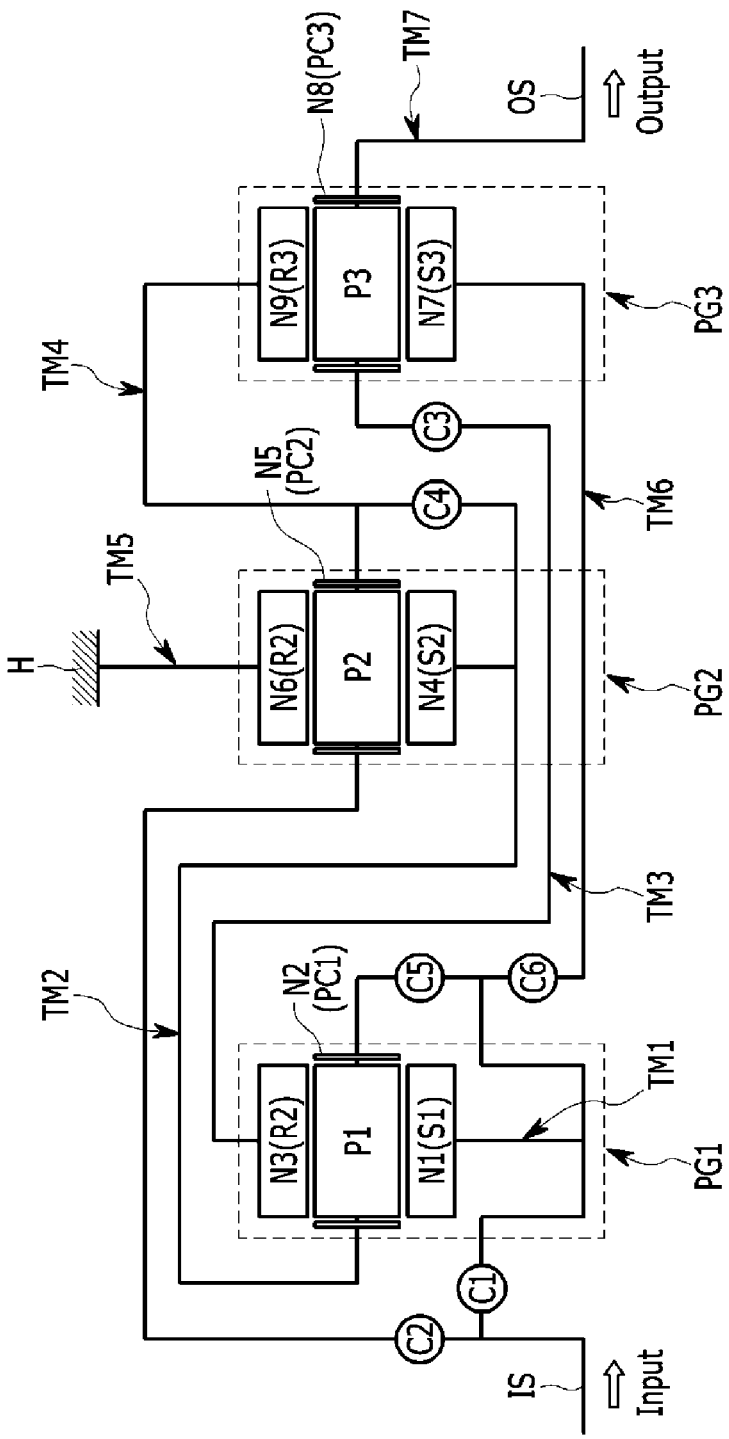
FIG. 1 is a schematic diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, the planetary gear train according to various embodiments of the present invention includes first, second, third, and fourth planetary gear sets PG1, PG2, and PG3 arranged on a same axis, an input shaft IS, an output shaft OS, seven shafts TM1 to TM7 connected with rotation elements of the first, second, and third planetary gear sets PG1, PG2, and PG3, six control elements C1 to C6, and a transmission housing H.

Torque input from the input shaft IS is shifted by cooperative operation of the first, second, and third planetary gear sets PG1, PG2, and PG3, and then output through the output shaft OS.

The simple planetary gear sets are arranged in the order of first, second, and third planetary gear sets PG1, PG2, and PG3, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotation element N7, the third planet carrier PC3 acts as an eighth rotation element N8, and the third ring gear R3 acts as a ninth rotation element N9.

In the arrangement of the first, second, and third planetary gear sets PG1, PG2, and PG3, the second rotation element N2 is directly connected with the fourth rotation element N4, the fifth rotation element N5 is directly connected with the ninth rotation element N9, by the seven shafts TM1 to TM7.

The seven shafts TM1 to TM7 are hereinafter described in detail.

The first shaft TM1 is connected with the first rotation element N1 (first sun gear S1), and selectively connectable with the input shaft IS.

The second shaft TM2 is connected with the second rotation element N2 (first planet carrier PC1) and the fourth rotation element N4 (second sun gear S2), and selectively connectable with the first shaft TM1.

The third shaft TM3 is connected with third rotation element N3 (first ring gear R1).

The fourth shaft TM4 is connected with the fifth rotation element N5 (second planet carrier PC2) and the ninth rotation element N9 (third ring gear R3), and selectively connectable with the input shaft IS, and selectively connectable with the second shaft TM2.

The fifth shaft TM5 is connected with the sixth rotation element N6 (second ring gear R2), and directly connected with the transmission housing H The sixth shaft TM6 is connected with the seventh rotation element N7 (third sun gear S3), and selectively connectable with the first shaft TM1.

The seventh shaft TM7 is connected with the eighth rotation element N8 (third planet carrier PC3), directly connected with the output shaft OS, and selectively connectable with the third shaft TM3.

The shaft TM1 to TM7, the input shaft IS, and the output shaft OS may be selectively interconnected with one another by control elements of six clutches C1, C2, C3, C4, C5, and C6.

The six control elements C1 to C6 are arranged as follows.

The first clutch C1 is arranged between the input shaft IS and the first shaft TM1, such that the input shaft IS and the first shaft TM1 may selectively become integral.

The second clutch C2 is arranged between the input shaft IS and the fourth shaft TM4, such that the input shaft IS and the fourth shaft TM4 may selectively become integral.

The third clutch C3 is arranged between the third shaft TM3 and the seventh shaft TM7, such that the third shaft TM3 and the seventh shaft TM7 may selectively become integral.

The fourth clutch C4 is arranged between the second shaft TM2 and the fourth shaft TM4, such that the second shaft TM2 and the fourth shaft TM4 may selectively become integral.

The fifth clutch C5 is arranged between the first shaft TM1 and the second shaft TM2, such that the first shaft TM1 and the second shaft TM2 may selectively become integral.

The sixth clutch C6 is arranged between the first shaft TM1 and the sixth shaft TM6, such that the first shaft TM1 and the sixth shaft TM6 may selectively become integral.

The control elements of the first, second, third, fourth, fifth, and sixth clutches C1, C2, C3, C4, C5, and C6 may be realized as multi-plate hydraulic pressure friction devices that are frictionally engaged by hydraulic pressure.

FIG. 2 is an operational chart for respective control elements at respective shift-stages in the planetary gear train according to various embodiments of the present invention.

As shown in FIG. 2, the planetary gear train according to various embodiments of the present invention performs shifting by operating three control elements at respective shift-stages.

In the forward first speed shift-stage D1, the first, fourth, and sixth clutches C1, C4, and C6 are operated. As a result, the input shaft IS and the first shaft TM1 are interconnected by the operation of the first clutch C1, the second shaft TM2 and the fourth shaft TM4 are interconnected by the operation of the fourth clutch C4, and the first shaft TM1 and the sixth shaft TM6 are interconnected by the operation of the sixth clutch C6. In this state, torque is input to the first shaft TM1. In addition, the fifth shaft TM5 acts as a fixed element, thereby realizing the forward first speed and outputting a shifted torque to the output shaft OS through the seventh shaft TM7.

In the forward second speed shift-stage D2, the first, third, and sixth clutches C1, C3, and C6 and the first brake B1 are operated. As a result, the input shaft IS and the first shaft TM1 are interconnected by the operation of the first clutch C1, the third shaft TM3 and the seventh shaft TM7 are interconnected by the operation of the third clutch C3, and the first shaft TM1 and the sixth shaft TM6 are interconnected by the operation of the sixth clutch C6. In this state, torque is input to the first shaft TM1. In addition, the fifth shaft TM5 acts as a fixed element, thereby realizing the forward second speed and outputting a shifted torque to the output shaft OS through the seventh shaft TM7.

In the forward third speed shift-stage D3, the first, fifth, and sixth clutches C1, C5, and C6 are operated. As a result, the input shaft IS and the first shaft TM1 are interconnected by the operation of the first clutch C1, the first shaft TM1 and the second shaft TM2 are interconnected by the operation of the fifth clutch C5, the and first shaft TM1 and the sixth shaft TM6 are interconnected by the operation of the sixth clutch C6. In this state, torque is input to the first shaft TM1. In addition, the fifth shaft TM5 acts as a fixed element, thereby realizing the forward third speed and outputting a shifted torque to the output shaft OS through the seventh shaft TM7.

In the forward fourth speed shift-stage D4, the first, second, and sixth clutches C1, C2, and C6 are operated. As a result, the input shaft IS and the first shaft TM1 are interconnected by the operation of the first clutch C1, the input shaft IS and the fourth shaft TM4 are interconnected by the operation of the second clutch C2, and the first shaft TM1 and the sixth shaft TM6 are interconnected by the operation of the sixth clutch C6. In this state, torque is input to the first shaft TM1 and the fourth shaft TM4. In addition, the fifth shaft TM5 acts as a fixed element, thereby realizing the forward fourth speed and outputting a shifted torque to the output shaft OS through the seventh shaft TM7.

In the forward fifth speed shift-stage D5, the second, fifth, and sixth clutches C2, C5, and C6 are operated. As a result, the input shaft IS and the fourth shaft TM4 are interconnected by the operation of the second clutch C2, the first shaft TM1 and the second shaft TM2 are interconnected by the operation of the fifth clutch C5, and the first shaft TM1 and the sixth shaft TM6 are interconnected by the operation of the sixth clutch C6. In this state, torque is input to the fourth shaft TM4. In addition, the fifth shaft TM5 acts as a fixed element, thereby realizing the forward fifth speed and outputting a shifted torque to the output shaft OS through the seventh shaft TM7.

In the forward sixth speed shift-stage D6, the second, third, and sixth clutches C2, C3, and C6 are operated. As a result, the input shaft IS and the fourth shaft TM4 are interconnected by the operation of the second clutch C2, the third shaft TM3 and the seventh shaft TM7 are interconnected by the operation of the third clutch C3, and the first shaft TM1 and the sixth shaft TM6 are interconnected by the operation of the sixth clutch C6. In this state, torque is input to the fourth shaft TM4. In addition, the fifth shaft TM5 acts as a fixed element, thereby realizing the forward sixth speed and outputting a shifted torque to the output shaft OS through the seventh shaft TM7.

In the forward seventh speed shift-stage D7, the second, third, and fifth clutches C2, C3, and C5 are operated. As a result, the input shaft IS and the fourth shaft TM4 are interconnected by the operation of the second clutch C2, the third shaft TM3 and the seventh shaft TM7 are interconnected by the operation of the third clutch C3, and the first shaft TM1 and the second shaft TM2 are interconnected by the operation of the fifth clutch C5. In this state, torque is input to the fourth shaft TM4. In addition, the fifth shaft TM5 acts as a fixed element, thereby realizing the forward seventh speed and outputting a shifted torque to the output shaft OS through the seventh shaft TM7.

In the forward eighth speed shift-stage D8, the first, second, and third clutches C1, C2, and C3 are operated. As a result, the input shaft IS and the first shaft TM1 are interconnected by the operation of the first clutch C2, the input shaft IS and the fourth shaft TM4 are interconnected by the operation of the second clutch C2, and the third shaft TM3 and the seventh shaft TM7 are interconnected by the operation of the third clutch C3. In this state, torque is input to the first shaft TM1 and the fourth shaft TM4. In addition, the fifth shaft TM5 acts as a fixed element, thereby realizing the forward eighth speed and outputting a shifted torque to the output shaft OS through the seventh shaft TM7.

In the reverse speed REV, the first, third, and fourth clutches C1, C3, and C4 are operated. As a result, the input shaft IS and the first shaft TM1 are interconnected by the operation of the first clutch C1, the third input shaft TM3 and the seventh shaft TM7 are interconnected by the operation of the third clutch C3, and the second shaft TM2 and the fourth shaft TM4 are interconnected by the operation of the fourth clutch C4. In this state, torque is input to the first shaft TM1. In addition, the fifth shaft TM5 acts as a fixed element, thereby realizing the reverse speed and outputting a shifted torque to the output shaft OS through the seventh shaft TM7.

As described above, a planetary gear train according to various embodiments of the present invention realizes at least eight forward speeds and at least one reverse speed by three planetary gear sets PG1, PG2, and PG3 by controlling six clutches C1, C2, C3, C4, C5, and C6.

In addition, a planetary gear train according to various embodiments of the present invention substantially improves driving stability by realizing shift-stages appropriate for rotation speed of an engine due to multiple speed-stages of an automatic transmission.

Furthermore, a planetary gear train according to various embodiments of the present invention maximizes engine driving efficiency by multiple speed-stages of an automatic transmission, and improves power delivery performance and fuel consumption.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft for receiving an engine torque;
    an output shaft for outputting a shifted engine torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    six control elements for selectively interconnecting the first to ninth rotation elements with each other;
    a first shaft fixedly connected with the first rotation element, and selectively connectable with the input shaft;
    a second shaft fixedly connected with the second rotation element and the fourth rotation element, and selectively connectable with the first shaft;
    a third shaft fixedly connected with the third rotation element;
    a fourth shaft fixedly connected with the fifth rotation element and the ninth rotation element, and selectively connectable with the input shaft;
    a fifth shaft fixedly connected with the sixth rotation element and fixedly connected with a transmission housing;
    a sixth shaft fixedly connected with the seventh rotation element and selectively connectable with the first shaft; and
    a seventh shaft fixedly connected with the eighth rotation element, selectively connectable with the third shaft, and fixedly connected with the output shaft.

2. The planetary gear train of claim 1, wherein
    the first planetary gear set comprises a single pinion planetary gear set, where the first rotation element is a first sun gear, the second rotation element is a first planet carrier, and the third rotation element is a first ring gear;
    the second planetary gear set comprises a single pinion planetary gear set, where the fourth rotation element is a second sun gear, the fifth rotation element is a second planet carrier, and the sixth rotation element is a second ring gear; and
    the third planetary gear set comprises a single pinion planetary gear set, where the seventh rotation element is a third sun gear, the eighth rotation element is a third planet carrier, and the ninth rotation element is a third ring gear.

3. The planetary gear train of claim 1, wherein the six control elements comprise:
    a first clutch selectively connecting the input shaft and the first shaft;
    a second clutch selectively connecting the input shaft and the fourth shaft;
    a third clutch selectively connecting the third shaft and the seventh shaft;
    a fourth clutch selectively connecting the second shaft and the fourth shaft;
    a fifth clutch selectively connecting the first shaft and the second shaft; and
    a sixth clutch selectively connecting the second shaft and the sixth shaft.

4. The planetary gear train of claim 3, wherein shift-stages realized by selective operation of three control elements among the six control elements comprise:
    a first forward speed shift-stage achieved by operation of the first, fourth, and sixth clutches;
    a second forward speed shift-stage achieved by operation of the first, third, and sixth clutches;
    a third forward speed shift-stage achieved by operation of the first, fifth, and sixth clutches;
    a fourth forward speed shift-stage achieved by operation of the first, second, and sixth clutches;
    a fifth forward speed shift-stage achieved by operation of the second, fifth, and sixth clutches;
    a sixth forward speed shift-stage achieved by operation of the second, third, and sixth clutches;
    a seventh forward speed shift-stage achieved by operation of the second, third, and fifth clutches;
    an eighth forward speed shift-stage achieved by operation of the first, second, and third clutches; and
    a reverse speed shift-stage achieved by operation of the first, third, and fourth clutches.

* * * * *